Jan. 21, 1947.  D. M. CHAPIN  2,414,449
DEPTH CONTROL DEVICE
Filed Aug. 18, 1943
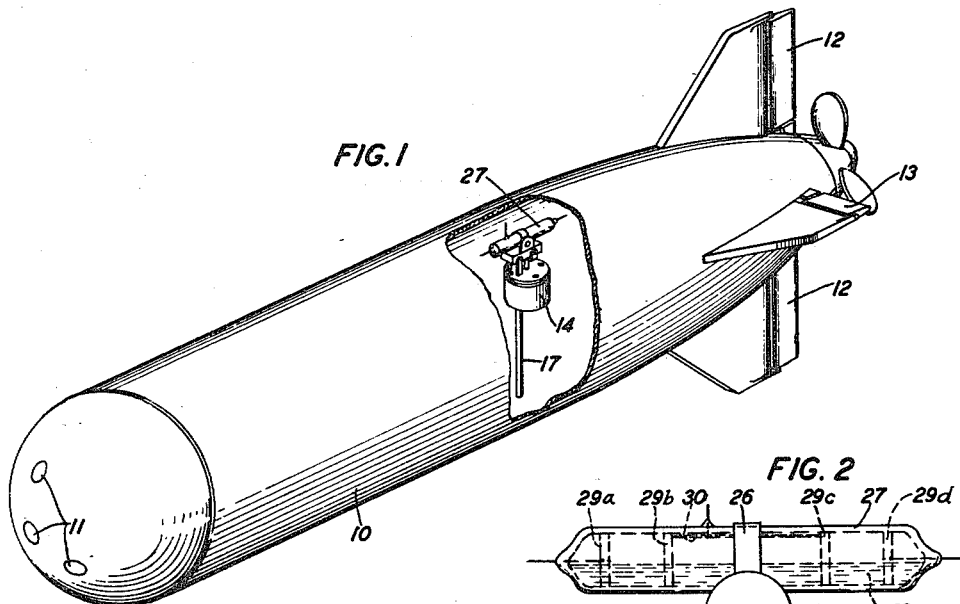
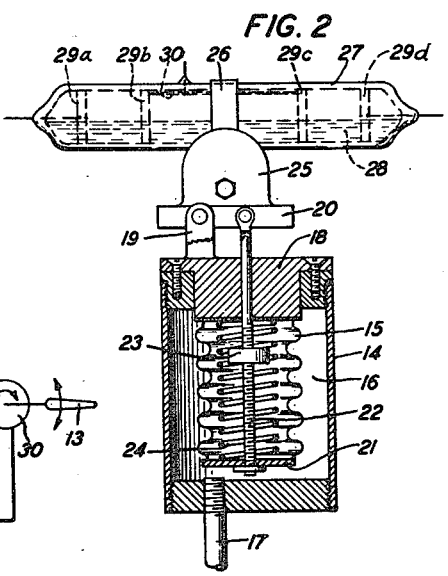
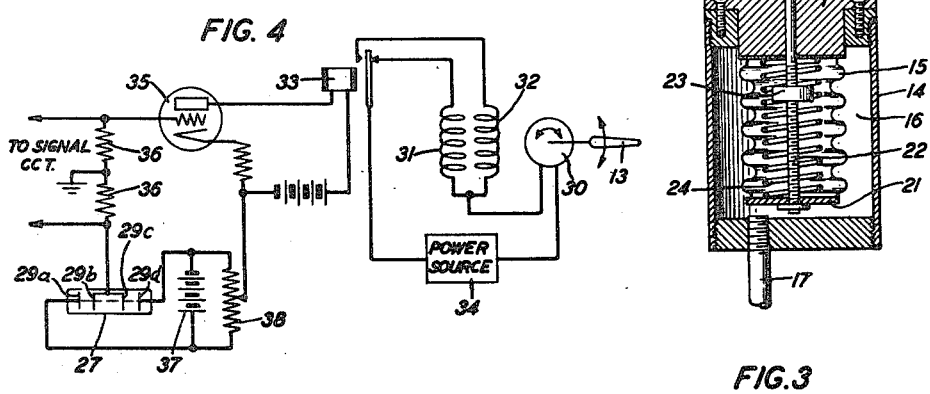
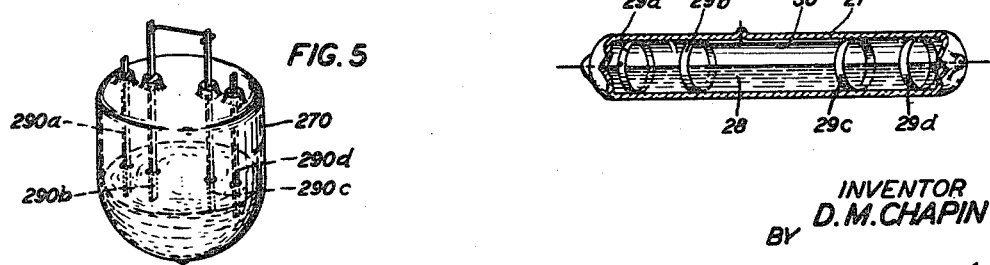
INVENTOR
D. M. CHAPIN
BY
Walter C. Kiesel
ATTORNEY Patented Jan. 21, 1947

2,414,449

UNITED STATES PATENT OFFICE 2,414,449

DEPTH CONTROL DEVICE

Daryl M. Chapin, Basking Ridge, N. J., assignor to Bell Telephone Laboratories, Incorporated, New York, N. Y., a corporation of New York Application August 18, 1943, Serial No. 499,140

10 Claims. (Cl. 114—25)

This invention relates to circuit control devices and more particularly to variable resistance elements especially suitable for trim or trim and depth control of signal guided torpedoes such as disclosed, for example, in the applications, Serial No. 491,794, filed June 22, 1943 of Hugh K. Dunn and Serial No. 495,116, filed July 17, 1943 of Raymond W. Ketchledge.

In signal guided torpedoes of the general constructions disclosed in the above-identified applications, the rudder and elevator are deflected in accordance with information derived from signals, which may be of audio or supersonic frequency, emanating from the target such as a submarine. In general, the control of the rudder and elevator is effected by way of a control circuit wherein the signals received by hydrophones mounted on the torpedo are resolved into a control signal in accordance with the polarity of which the rudder or elevator is deflected in one direction or the other to steer the torpedo to the target. In some cases, it is desirable that the torpedo be maintained traveling level at a prescribed depth whenever the target signals are below a preassigned intensity level. This may be accomplished, as disclosed in the above-identified applications, by introducing into the elevator control circuit components of potential, which may be direct or alternating current depending upon the character of the circuit, the polarity and amplitude of which are determined by the trim of the torpedo and its position relative to the prescribed depth.

One general object of this invention is to improve the operating characteristics of variable impedance circuit control elements.

More specifically, objects of this invention are to:

Improve the trim or trim and depth control of signal guided torpedoes;

Simplify the control element in a torpedo having both trim and depth control elements;

Produce a variable impedance control element suitable for use in a variety of circuits, for example in both alternating and direct current systems and in both low impedance and high impedance systems;

Increase the sensitivity of trim and trim and depth controls in a signal guided torpedo;

Improve the stability of variable resistance circuit control elements; and

Obtain uniform trim control of a torpedo or other moving body throughout a wide range of angles of tilt of the torpedo or body.

In one illustrative embodiment of this invention, a circuit control element comprises a sealed container or vessel partially filled with a liquid resistance material or electrolyte, and electrodes adapted to project into the electrolyte, the volume of electrolyte between the electrodes being a function of an angular position of the container or vessel.

In accordance with one feature of this invention, the control element is mounted for tilting about a transverse axis thereof and comprises three electrodes mounted in line and so arranged that when the element tilts, the volume of electrolyte between the intermediate electrode and one outer electrode increases and that between the intermediate electrode and the other outer electrode decreases, whereby the resistances between the intermediate electrode and the two outer electrodes vary in opposite sense. Thus, if a source, such as a battery, is connected across the outer electrodes, the potential of the intermediate electrode varies with the tilting of the vessel and is of the polarity and magnitude determined by the direction and angle of tilt respectively of the vessel. The vessel may be mounted in a torpedo in such manner that when the torpedo is level, the two resistances are equal and when the torpedo departs from the level position, the control element produces a potential, impressed upon the elevator control circuit, of such polarity and amplitude as to tend to cause deflection of the elevator to return the torpedo to level position.

In accordance with another feature of this invention, means are provided for tilting the container proportionately to the departure of the torpedo from a prescribed depth of submersion whereby the control element produces a potential of such polarity and amplitude that, when impressed upon the elevator control circuit, it results in deflection of the elevator to steer the torpedo toward the prescribed depth. The control element, thus, may be utilized simultaneously as both a trim and depth control.

In accordance with a further feature of this invention, the intermediate electrode is formed of two similar parts equally spaced from the corresponding end electrode, whereby the polarizations are fixed and erratic operating characteristics are avoided.

In accordance with still another feature of this invention, the electrolyte is of a concentrated solution of ethyl phosphoric acid in methyl alcohol, for example approximately one part in fifty. Such a solution is characterized by very weak ionization so that changes in ion concentration with passage of current are substantially negligible for practical purposes. Such solution, further, is characterized by stability thereof adjacent the electrodes. Hence, only resistance changes in accordance with variations in the electrolyte level are obtained and stable operating characteristics are realized. Also, such solution is suitable for use in either alternating current or direct current and high or low resistance control elements.

The invention and the above noted and other features thereof will be understood more clearly and fully from the following detailed description with reference to the accompanying drawing in which:

Fig. 1 is a perspective view of a sonically guided torpedo, illustrating the application of a control element constructed in accordance with this invention to trim and depth control of the torpedo, a portion of the torpedo body being broken away to show the control element;

Fig. 2 is an elevational view, partly in section, of the control element illustrated in Fig. 1;

Fig. 3 is a sectional view of the variable resistance unit or cell included in the control element shown in Figs. 1 and 2;

Fig. 4 is a circuit diagram illustrating one manner of associating a control element constructed in accordance with this invention, with a control circuit, for example the control circuit for the elevator in the torpedo shown in Fig. 1; and, Fig. 5 is a perspective view of a variable resistance unit illustrative of another embodiment of this invention.

Referring now to the drawing, the torpedo illustrated in Fig. 1 comprises a body 10 having a nose portion on which a plurality of hydrophones 11 are mounted, and having a tail portion on which the vertical rudder 12 and the horizontal rudder or elevator 13 are mounted. The rudder and elevator are controlled in accordance with signals received by the hydrophones, as in the manner described in the applications noted hereinabove, to steer the torpedo to the target, the control apparatus, not shown, being mounted within the torpedo body.

Suitably mounted within the body 10 is a trim and depth control element which, as shown in Fig. 2, comprises a casing 14 fixed in the body and enclosing a bellows 15. The casing and bellows define a fluide-tight chamber 16 having communication with the sea by way of a tube or pipe 17 terminating at a port in the torpedo body, so that the pressure within the chamber 16 is a function of the depth to which the torpedo is submerged at any instant. The cover 18 of the casing 14 has extending therefrom a bracket 19 on which a rocker member or arm 20 is pivotally mounted, the arm 20 being connected to the base 21 of the bellows by a connecting link or rod 22 which may carry a stop or collar 23. Within the bellows 15 is a helical spring 24 which bears against the cover 18 of the casing and the base 21 of the bellows and serves to provide the desired stiffness to the bellows. The rocker arm 20 mounts a carrier 25 to which a variable resistance unit is secured, as by a band 26.

The resistance unit, in one illustrative construction shown in Fig. 3, comprises a sealed container or vessel 27, for example of a vitreous material, which is partly filled with a liquid electrolyte 28, the composition and character of which will be described hereinafter. Within the container are four annular electrode members 29a to 29d inclusive, for example rings of platinum, the electrode members 29b and 29c being connected electrically as by a tie wire 30 to constitute a single electrode. Advantageously, the members 29b and 29c are equally spaced from the electrode members 29a and 29d respectively so that when the container or vessel is level, the resistances between the end electrodes 29a and 29d and the intermediate electrode members 29b, 29c are equal.

The resistance unit, the rocker arm 20 and the bellows 15 are so correlated that when the torpedo is at a preassigned depth of submersion and is level at this depth, the resistance unit is level. If the torpedo rises above or sinks below this depth, the bellows contracts or expands and rocks the arm 20 in the direction and through an angle dependent upon the position and distance respectively of the torpedo with respect to the prescribed depth. Thus, the resistance between the intermediate electrode and each of the end electrodes is varied in accordance with the direction and magnitude of the motion of the rocker arm. Likewise, if the torpedo is other than level, i. e., if its nose is tilted upwardly or downwardly, the resistance unit is tilted accordingly, and the resistance between the intermediate electrode and each of the end electrodes is varied in sense and magnitude determined by the direction and degree of the torpedo tilt.

One way of associating the control element with the elevator control circuit of a torpedo is illustrated in Fig. 4. As shown in this figure, the elevator 13 is coupled by a suitable drive or gearing (not shown) to a reversible motor 30 having a pair of field windings 31 and 32 connected to the contacts of a relay 33. The direction of operation of the motor 30 is determined by which of the windings 31 and 32 is energized through the circuit including a power source 34 and the relay armature. The relay is connected in the output circuit of the direct current amplifier 35 the input circuit of which includes resistances 36. The potential derived from the signal control circuit, which may be of the forms disclosed in the applications referred to hereinabove, is impressed across the resistances 36. In general, the relay 33 operates to close one or the other of its contacts in accordance with the polarity of the potential appearing across the resistance 36.

The input circuit for the direct current amplifier 35 includes also a network including a source 37, such as a battery, across which a potentiometer resistance 38 and the electrodes 29a and 29d of the resistance unit are bridged. The resistance 38 may be employed for bias or elevator follow up control as disclosed in the applications mentioned heretofore, the contact arm thereof being connected to the cathode of the amplifier 35 as shown. The intermediate electrode 29b, 29c of the resistance unit is connected to the cathode side of the input resistor 36 as shown.

Assume, for purposes of discussion, that the contact arm of the potentiometer resistance 38 is in its center position and that no potential from the signal control circuit is being impressed across the input resistor 36. If the torpedo is at the preassigned depth and is level at this depth, the resistances between the intermediate electrode 29b, 29c and the two end electrodes 29a and 29d are equal so that the intermediate electrode 29b, 29c is at the potential of the midpoint of the battery 37 and no potential difference appears between the cathode and grid of the amplifier 35. When the resistance unit tilts due to the non-level position of the torpedo or its position at other than the preassigned depth in the manner described hereinbefore, the resistances between the two end electrodes 29a and 29d and the intermediate electrode 29b, 29c become unbalanced so that the potential of the intermediate electrode varies, in sign and magnitude determined by the direction and degree of the tilt. Thus, the grid potential is varied to cause operation of the relay, and through it of the motor, in such manner as to deflect the rudder in the direction tending to bring the torpedo to level position at the preassigned depth.

In an actual circuit, means may be provided, as disclosed in the aforementioned applications, to render the depth and trim controls ineffective when the target signal intensities at the hydrophones 11 are of at least a prescribed intensity.

Obviously, a resistance varying device of the type described should have stable operating characteristics, that is the resistance thereof and resistance changes therein should be substantially constant under the intended operating conditions, e. g. of voltage, current and temperature, and should be constant also with respect to time. Further, the device should have a long inactive life. Principal of the factors determining the stability of operation and the life is the character of the electrolyte. A solution of approximately one part of ethyl phosphoric acid in 50 parts of alcohol, for example absolute methyl alcohol, provides an electrolyte having very stable characteristics over a wide variety of operating conditions. Such a solution remains liquid to very low temperatures and does not exhibit erratic changes in resistance throughout a wide range of temperatures, e. g. from about −50 degrees centigrade to over +30 degrees centigrade. Further, in a unit having such solution as the electrolyte, no substantial changes in concentration with passage of current occur. Ethyl phosphoric acid is quite soluble in methyl alcohol but only a fraction of a per cent thereof is ionized and acted upon by current flow through the electrolyte. Hence, no substantial changes in resistance of the unit except those associated with tilting occur in the operation of the device and the variations in the potential of the intermediate electrode are accurately related to the angle of tilt. In a typical unit, connected as shown in Fig. 4, a linear relation between the potential of the intermediate electrode and the midpoint of the battery over a range of ±6 degrees of tilt has been obtained.

Further, such a solution it has been found produces no appreciable sticking effect at the electrodes or the vessel so that the unit is responsive to small angles of tilt and with no appreciable time lag whereby sensitive control is realized.

It will be noted also that resistance unit is effective to produce a potential change in the input circuit of the amplifier even if the angle of tilt is so large that no electrolyte remains between the intermediate electrode and one of the end electrodes. Also, it is to be noted that the two part construction of the intermediate electrode fixes the polarization in that each electrode member carries current in the same direction at all times and drift in the potential of the intermediate electrode is thus prevented. Moreover, a unit of the construction described is suitable for both alternating current and direct current use and in both low and high resistance circuits.

Another resistance unit construction especially suitable for use as a low resistance potentiometer element, e. g. of the order of 12,500 ohms, at moderate voltages, e. g. of the order of 45 volts, is illustrated in Fig. 5 and comprises a sealed, vitreous vessel 270 and four linear, platinum wire, strip electrode members 290a to 290d, inclusive, the electrode members being mounted in line and the intermediate members being connected together and equally spaced from the end members. In a typical unit for operation at the resistance and voltage noted, the electrode members may be strips of eight mil by one-eighth inch platinum and the separation between the strips 290b and 290c and the strips 290a and 290d, respectively, may be approximately one-eighth inch. The electrolyte is a solution of ethyl phosphoric acid in methyl alcohol as in the unit illustrated in Fig. 3 and described heretofore. In such a unit a linear relation between potential of the intermediate electrode and the angle of tilt over a range of ±20 degrees has been obtained.

Although specific embodiments of the invention have been shown and described, it will be understood that they are but illustrative and that various modifications may be made therein without departing from the scope and spirit of this invention as defined in the appended claims.

What is claimed is:

1. A control system for a moving body, comprising means for controlling the motion of the body in one space dimension, a control circuit for affecting operation of said controlling means in accordance with the potential appearing across two points in said circuit, said control circuit comprising a control element including a housing mounted on the body, and having a liquid resistance material therein and a pair of end electrodes and intermediate electrode means within said housing and spaced in a direction at an angle to said dimension, said housing being coupled to the body and said resistive material filling a portion only of said housing whereby the volume of said material between said intermediate electrode means and each of said end electrodes varies in response to tilting of said body to alter the angle between said dimension and said direction, means impressing a potential between said end electrodes, means connecting said potential impressing means to one of said points, and means connecting said intermediate electrode means to the other of said points.

2. A control system as defined in claim 1 wherein said intermediate electrode means comprises two electrically integral parts each opposite a respective one of said end electrodes.

3. A control system as defined in claim 1 comprising means for tilting said housing in accordance with the direction and magnitude of departure of the body in said dimension from a preassigned position.

4. A torpedo steering system comprising an elevator, actuating means for said elevator, electrical control means for said actuating means for effecting deflection of said elevator thereby in accordance with the potential between two terminals of said control means, a potentiometer control element mounted on the torpedo and responsive to tilting thereof about a transverse axis, said element comprising a housing having a liquid, resistive electrolyte therein and a pair of end electrodes and an intermediate electrode within said housing, said end and intermediate electrodes being arrayed parallel to the longitudinal axis of the torpedo and each extending at an angle to both said longitudinal and transverse axes, said electrolyte filling only a portion of said housing so that the volume of electrolyte between said intermediate electrode and each of said end electrodes varies proportionately to the angle of tilt of said housing, a source of potential connected between said end electrodes, a connection between said intermediate electrode and one of said terminals, and a connection between said source and the other of said terminals.

5. A torpedo steering system as defined in claim 4 wherein said control element comprises means for tilting said housing in accordance with the direction and extent of departure of the torpedo from a preassigned depth of submersion thereof.

6. A torpedo steering system as defined in claim 4 wherein said control element comprises a rocker arm mounting said housing, a bellows coupled to and effective to tilt said rocker arm, and means coupling said bellows to the sea whereby the pressure effective thereon varies in accordance with the depth of submersion of the torpedo.

7. An electrolytic potentiometer element comprising a housing having a liquid, weakly ionizable electrolyte therein, two pairs of electrode members within said housing, all of said members being mounted in alignment, and means directly electrically connecting the two intermediate electrode members, said electrolyte filling a portion only of said housing such that when said housing is level, all of said electrode members are immersed partially in said electrolyte, whereby the volume of electrolyte between each of said pairs of electrode members varies proportionately to the tilt of said housing with respect to an axis transverse to the axis of alignment of said electrode members.

8. An electrolytic potentiometer element as defined in claim 7 wherein said electrode members are coaxial wire annuli.

9. An electrolytic potentiometer element as defined in claim 7 wherein said electrode members are parallel strips.

10. An electrolytic variable resistance element comprising a housing, electrodes within said housing, and an electrolyte partially filling said housing, said electrolyte being a solution of approximately one part ethyl phosphoric acid in fifty parts of alcohol.

DARYL M. CHAPIN.